US009357421B2

(12) United States Patent
Hwang et al.

(10) Patent No.: US 9,357,421 B2
(45) Date of Patent: *May 31, 2016

(54) INDICATION OF USER EQUIPMENT TRANSMIT POWER CAPACITY IN CARRIER AGGREGATION

(71) Applicant: MEDIATEK INC., Hsinchu (TW)

(72) Inventors: Chien-Hwa Hwang, Hsinchu County (TW); Chia-Chun Hsu, Taipei (TW); William Plumb, Charlestown, MA (US)

(73) Assignee: MEDIATEK INC., Hsinchu (TW)

(*) Notice: Subject to any disclaimer, the term of this patent is extended or adjusted under 35 U.S.C. 154(b) by 130 days.

This patent is subject to a terminal disclaimer.

(21) Appl. No.: 14/257,226

(22) Filed: Apr. 21, 2014

(65) Prior Publication Data

US 2014/0226516 A1 Aug. 14, 2014

Related U.S. Application Data

(63) Continuation of application No. 13/200,783, filed on Sep. 29, 2011, now Pat. No. 8,730,829.

(60) Provisional application No. 61/388,672, filed on Oct. 1, 2010, provisional application No. 61/481,702, filed on May 2, 2011, provisional application No. 61/411,062, filed on Nov. 8, 2010.

(51) Int. Cl.
*H04W 24/10* (2009.01)
*H04L 5/00* (2006.01)
(Continued)

(52) U.S. Cl.
CPC .............. *H04W 24/10* (2013.01); *H04L 5/001* (2013.01); *H04W 52/365* (2013.01); *H04W 52/34* (2013.01)

(58) Field of Classification Search
CPC . H04W 52/365; H04W 24/10; H04W 52/367; H04W 72/0473; H04L 5/001
See application file for complete search history.

(56) References Cited

U.S. PATENT DOCUMENTS 5,991,518 A 11/1999 Jardine et al. ............ 395/182.02
2004/0147276 A1* 7/2004 Gholmieh ........... H04W 52/365
455/522

(Continued)

FOREIGN PATENT DOCUMENTS

CN 101715207 A 5/2010
CN 101848487 A 9/2010

(Continued)

OTHER PUBLICATIONS

International Search Report and Written Opinion of International Search Authority for PCT/CN2011/080470 dated Dec. 29, 2011 (10 pages).
The Taiwan IPO has prepared an Office Action for TW patent application 100135448 (no English translation is available) dated Nov. 11, 2013 (6 pages).

(Continued)

*Primary Examiner* — Jung Park
(74) *Attorney, Agent, or Firm* — Imperium Patent Works; Zheng Jin

(57) ABSTRACT

A method of power headroom reporting (PHR) is proposed. A UE is configured with a plurality of component carriers (CCs) and is served by one or more power amplifiers (PAs) in a wireless system with carrier aggregation. The UE determines transmit power limitation (TPL) information that comprises a set of TPL values, each TPL value corresponds to a UE-configured maximum transmit power for UE-level, PA-level, and CC-level. The TPL information is then reduced to non-redundant TPL values. Based on the non-redundant TPL values, the UE determines power headroom (PH) information that comprises a set of PH values. Each PH value equals to a TPL value subtracted by a UE-calculated transmit power. The UE reports the PH information to a base station via a fixed-length or variable-length MAC CE at each PHR reporting instance.

20 Claims, 7 Drawing Sheets

(51) Int. Cl.
*H04W 52/36* (2009.01)
*H04W 52/34* (2009.01)

(56) References Cited

U.S. PATENT DOCUMENTS

| | | | |
|---|---|---|---|
| 2010/0158147 A1 | 6/2010 | Zhang et al. | 375/260 |
| 2010/0238863 A1 | 9/2010 | Guo et al. | 370/328 |
| 2010/0246561 A1 | 9/2010 | Shin et al. | 370/345 |
| 2011/0038271 A1 | 2/2011 | Shin et al. | 370/252 |
| 2011/0045863 A1 | 2/2011 | Lee et al. | 455/517 |
| 2011/0105173 A1 | 5/2011 | Haim et al. | 455/522 |
| 2011/0275403 A1 | 11/2011 | Chen et al. | 455/522 |
| 2011/0287804 A1 | 11/2011 | Seo et al. | 455/522 |
| 2011/0292874 A1 | 12/2011 | Ho et al. | 370/328 |
| 2012/0052903 A1 | 3/2012 | Han et al. | 455/522 |
| 2012/0082041 A1 | 4/2012 | Damnjanovic et al. | 370/252 |
| 2012/0083310 A1 | 4/2012 | Zhao et al. | 455/522 |
| 2012/0106490 A1* | 5/2012 | Nakashima | H04W 52/42 370/329 |
| 2012/0218904 A1 | 8/2012 | Narasimha et al. | 370/248 |
| 2013/0051214 A1 | 2/2013 | Fong et al. | 370/216 |

FOREIGN PATENT DOCUMENTS

| | | |
|---|---|---|
| JP | 2013529030 A | 7/2011 |
| JP | 2013516809 A | 5/2013 |
| WO | WO2010087622 A2 | 8/2010 |

OTHER PUBLICATIONS

3GPP TSG-RAN WG1 #60bis R1-101852; Alcatel-Lucent Shanghai Bell, Alcatel-Lucent; Power Headroom Reporting for Carrier Aggregation; Apr. 12-16, 2010; Beijing, China (3 pages).
3GPP TSG RAN WG1 #61 Meeting R1-102946; Nokia Siemens Networks, Nokia Corporation; Power Headroom Reporting for Uplink Carrier aggregation; May 10-14, 2010; Montreal, Canada (4 pages).
JPOA for JP patent application 2013-530553 dated Feb. 25, 2014 (3 pages).
R1-104545 3GPP TSG-RAN WG1 Meeting #62, MediaTek Inc., Views on Per UE PHR, Madrid, Spain, Aug. 23-27, 2010 (3 pages).
EPO, Search Report for the EP patent application 11828150.0 dated Oct. 15, 2015 (9 pages).
3GPP TS 36.321 V9.3.0 (Jun. 2010), 3rd Generation Partnership Project; Technical Specification Group radio Access Network; Evolved Universal Terrestrial radio Access (E-UTRA); Medium access Control (MAC) Protocol Specification (Release 9), *Section 6.1.3.6*.
3GPP TSG-RAN WG2 Meeting #70bis, R2-10358, Nokia Siemens Networks et al., Details of PHR for Carrier Aggregation, Stockholm, Sweden dated Jun. 28-Jul. 2, 2010 (5 pages).
3GPP TSG RAN WG2 meeting #66bis R2-093723, CATT, Impact of CA on MAC Layer, Los Angeles, USA dated Jun. 29-Jul. 3, 2009 (3 pages).

* cited by examiner

INDICATION OF USER EQUIPMENT TRANSMIT POWER CAPACITY IN CARRIER AGGREGATION

CROSS REFERENCE TO RELATED APPLICATIONS

This application is a continuation, and claims priority under 35 U.S.C. §120 from nonprovisional U.S. patent application Ser. No. 13/200,783, entitled "Method of Uplink MDT Measurement," filed on Sep. 29, 2011, the subject matter of which is incorporated herein by reference. application Ser. No. 13/200,783 was issued on May 20, 2014 as U.S. Pat. No. 8,730,829. Application Ser. No. 13/200,783, in turn, claims priority under 35 U.S.C. §119 from U.S. Provisional Application No. 61/388,672, entitled "Reporting Mechanism for Transmission Power in Carrier Aggregation," filed on Oct. 1, 2010; U.S. Provisional Application No. 61/411,062, entitled "Mechanism for Reporting Maximum Transmission Power in Carrier Aggregation," filed on Nov. 8, 2010; U.S. Provisional Application No. 61/481,702, entitled "Indication of User Equipment Transmit Power Capacity in Carrier Aggregation," filed on May 2, 2011, the subject matter of which is incorporated herein by reference.

TECHNICAL FIELD

The disclosed embodiments relate generally to wireless network communications, and, more particularly, to configuring and reporting maximum transmission power and power headroom from user equipments to base stations in carrier aggregation systems.

BACKGROUND

A Long-Term Evolution (LTE) system offers high peak data rates, low latency, improved system capacity, and low operating cost resulting from simple network architecture. An LTE system also provides seamless integration to older wireless network, such as GSM, CDMA and Universal Mobile Telecommunication System (UMTS). Enhancements to LTE systems are considered so that they can meet or exceed International Mobile Telecommunications Advanced (IMT-Advanced) fourth generation (4G) standard. One of the key enhancements is to support bandwidth up to 100 MHz and be backwards compatible with the existing wireless network system. Carrier aggregation (CA) is introduced to improve system throughput. With carrier aggregation, the LTE-Advanced system can support peak target data rates in excess of 1 Gbps in the downlink (DL) and 500 Mbps in the uplink (UL). Such technology is attractive because it allows operators to aggregate several smaller contiguous or non-continuous component carriers (CC) to provide a larger system bandwidth, and provides backward compatibility by allowing legacy users to access the system by using one of the component carriers.

Orthogonal frequency division multiplexing (OFDM) radio technology has been incorporated into LTE/LTE-A because it enables high data bandwidth to be transmitted efficiently while still providing a high degree of resilience to reflections and interference. In OFDM communication systems, the transmit power of each mobile station (UE) needs to be maintained at a certain level and regulated by the network. The maximum transmit power of each UE, however, is different depending on UE capacity. Power headroom report (PHR) is a mechanism to configure the UE to provide its power capacity and usage to the network. A UE uses PHR mechanism to periodically provide its serving base station (eNB) with its power headroom (PH), which is defined as a power offset between a UE-configured maximum transmit power and a UE-calculated current UE transmit power. Based on the received PH information, the eNB can regulate the UE transmit power with proper resource allocation.

FIG. 1 (Prior Art) illustrates a power headroom (PH) and other related parameters of a UE in LTE Rel-8/9 systems without carrier aggregation. The PH value of the UE is defined in Eq. (1), while the UE-configured maximum output power $P_{CMAX}$ is defined in Eq. (2):

$$PH = P_{CMAX} - UE \text{ transmit Power} \quad (1)$$

$$P_{CMAX\_L} \leq P_{CMAX} \leq P_{CMAX\_H} \quad (2)$$

where
$P_{CMAX\_L}$=MIN $\{P_{EMAX}-\Delta T_C, P_{POWERCLASS}$-MPR-A-MPR-$\Delta T_C\}$
$P_{CMAC\_H}$=MIN $\{P_{EMAX}, P_{POWERCLASS}\}$
$P_{EMAX}$ is configured by higher layers
$P_{POWERCLASS}$ is the maximum UE output power
Maximum Power Reduction (MPR): the maximum allowed reduction of maximum power of certain modulation order and the number of resource blocks
Additional Maximum Power Reduction (A-MPR): the maximum allowed reduction of maximum power for the number of resource blocks and the band
$\Delta T_C$=1.5 dB when the CC at the edge of a band; 0 dB otherwise FIG. 2 (Prior Art) illustrates multiple power headroom values and other related parameters of a UE in LTE Rel-10 systems with carrier aggregation. In LTE Rel-10 systems, more flexible resource assignments are required to support advanced features including carrier aggregation, simultaneous PUCCH (Physical Uplink Control Channel) and PUSCH (Physical Uplink Shared Channel) transmission, parallel transmission of PUSCHs on multiple CCs, multi-clustered PUSCH, and power scaling. In the example of FIG. 2, the UE is configured with two component carriers CC1 and CC2. The UE-configured maximum output powers for CC1 (e.g., $P_{CMAX,C1}$) and for CC2 (e.g., $P_{CMAX,C2}$) depend on upper layer configurations (e.g., $P_{MAX\_CC1}$ and $P_{MAX\_CC1}$) and other CC-related parameters such as MPR, A-MPR, and $\Delta T_C$. Furthermore, because CC1 and CC2 belong to the same UE, and are served by the same or different power amplifier(s), the total maximum output power of both CC1 and CC2 may be limited to additional constraints such as $P_{MAX\_UE}$ or $P_{MAX\_PA}$. As a result, multiple PH values need to be reported to the eNB for UE transmit power control. Therefore, the existing PHR mechanism for Rel-8/9 systems without CA is no longer adequate to consider various transmit power limitations imposed on multiple configured CCs of a UE, on power amplifiers that serve the CCs, and on the UE.

SUMMARY

A method of power headroom reporting (PHR) is proposed. A UE is configured with a plurality of component carriers (CCs) and is served by one or more power amplifiers (PAs) in a wireless system with carrier aggregation. The UE determines transmit power limitation (TPL) information that comprises a set of TPL values, each TPL value corresponds to a UE-configured maximum transmit power for UE-level, PA-level, and CC-level. The TPL information is then reduced to non-redundant TPL values. Based on the non-redundant TPL values, the UE determines power headroom (PH) information that comprises a set of PH values. Each PH value equals to a TPL value subtracted by a UE-calculated transmit power.

A new PHR format is proposed for multi-layer power headroom reporting. In one example, the UE reports the PH information to a base station via a fixed-length MAC CE at each PHR reporting instance. In another example, the UE reports the PH information to a base station via a variable-length MAC CE at each PHR reporting instance. The length indication may be included in the MAC sub-header or in the MAC PDU. A new LCID is assigned in the MAC sub-header for MAC CE PHR.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
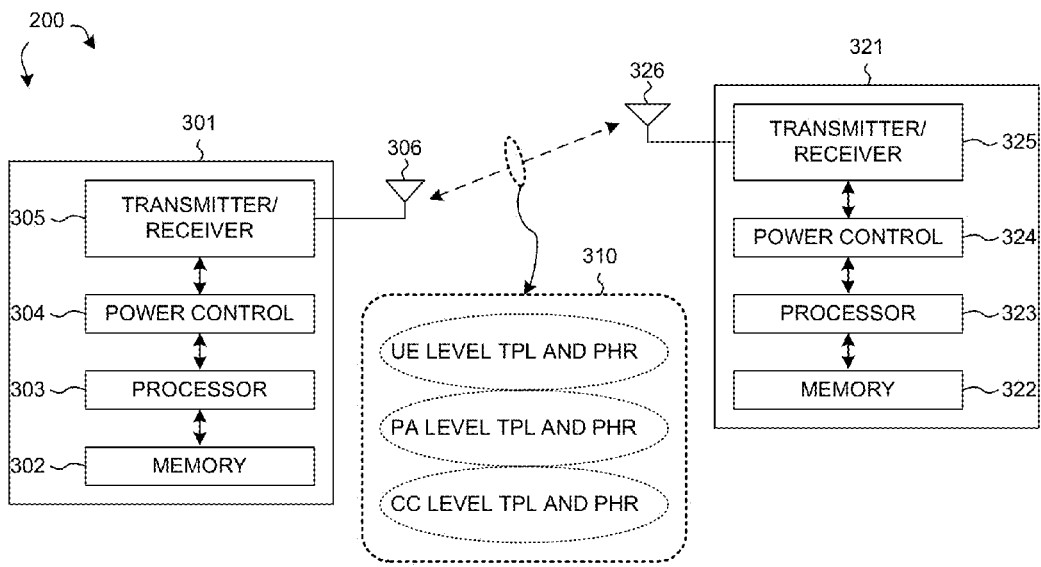
FIG. 3 is a simplified block diagram of a user equipment and a base station in an LTE/LTE-A Rel-10 wireless communication system with PHR mechanism in accordance with one novel aspect.

FIG. 3 is a simplified block diagram of a user equipment UE301 and a base station eNB321 in an LTE/LTE-A Rel-10 wireless communication system 300 in accordance with one novel aspect. In wireless communication system 300, the transmit power of UE301 needs to be maintained at a certain level achieve desired channel quality and to maximize system capacity. Meanwhile, the transmit power of UE301 is regulated by eNB321 so that coexisting systems are not severely interfered with each other. The allowable maximum transmit power, however, is different for each UE depending on the capacity of the UE. For example, for a UE with very good capability on the suppression of out-of-band emission and spurious emission, its transmission power is allowed to be larger than a UE with a worse emission suppression capability. In addition, the maximum transmit power of a UE is related to resource allocation of the UE (e.g., the modulation and coding scheme (MCS) and the resource location/size occupied by the UE). Power headroom report (PHR) is a mechanism that configures a UE to report its power capacity and usage.

In the example of FIG. 3, UE301 comprises memory 302, a processor 303, a power control module 304, and a transmitter and receiver 305 coupled to antenna 306. Similarly, eNB321 comprises memory 322, a processor 323, a power control module 324, and a transmitter and receiver 325 coupled to antenna 326. In LTE/LTE-A Rel-10 system 300 with carrier aggregation (CA), UE301 is configured with multiple component carriers (CCs), and each carrier is served by a corresponding power amplifier (PA). In one novel aspect, to facilitate the PHR mechanism, the transmit power limitations (TPL) of a UE is configured in three levels, a first UE-level TPL, a second PA-level TPL, and a third CC-level TPL. The different levels of TPL information are then reduced to non-redundant TPL values for efficient power headroom reporting.

First, the CC-level TPL is to used to limit the transmit power of the i-th CC not be larger than $P_{EMAX,i}$. $P_{EMAX,i}$ is the maximum transmit power for the i-th CC configured by higher layers. If the UE-configured maximum transmit power of the i-th CC is denoted as $P_{MAX\_CC,i}$ and the per-CC PH of the i-th CC is denoted as $PH_{CC,i}$, then mathematically we have:

$$PH_{CC,i} = P_{MAX\_CC,i} - P_{CC,i} \quad (3)$$

$$P_{EMAX,i} - \Delta T_C <= P_{MAX_{CC,i}} <= P_{EMAX,i} \quad (4)$$

where $\Delta T_C = 1.5$ dB when the i-th CC is at the edge of a band; 0 dB otherwise $P_{CC,i}$ is the transmit power of the i-th CC.

Second, the PA-level TPL is used to limit the output power of the j-th PA not be larger than $P_{MAX\_PA,j}$ to avoid bad efficiency and large out-of-band emission for the j-th PA. If the per-PA PH of the j-th PA is denoted as $PH_{PA,j}$, then mathematically we have:

$$PH_{PA,j} = P_{MAX\_PA} - P_{PA,j} \quad (5)$$

$$P_{POWERCLASS} - MPR_{PA,j} - A\text{-}MPR_{PA,j} - \Delta T_C <= P_{MAX\_PA,j} <= P_{POWERCLASS} \quad (6)$$

where $P_{POWERCLASS}$ is the maximum UE output power $MPR_{PA,j}$: MPR for the resources of CCs served by the j-th PA, and Maximum Power Reduction (MPR) is the maximum allowed reduction of maximum power of certain modulation order and the number of resource blocks $A\text{-}MPR_{PA,j}$: A-MPR for the resource of the CCs served by the j-th PA, and Additional Maximum Power Reduction (A-MPR) is the maximum allowed reduction of maximum power for the number of resource blocks and the band $\Delta T_C$ is the maximum of $\Delta T_{C,i}$'s $P_{PA,j}$ is the sum of transmit powers of CCs served by the j-th PA.

Third, the UE-level TPL is used to limit the total UE transmit power not be larger than $P_{POWERCLASS}$, which is the maximum UE output power. If the UE-configured maximum transmit power of the UE is denoted as $P_{MAX\_UE}$, and the per-UE PH is denoted as $PH_{UE}$, then mathematically we have:

$$PH_{UE} = P_{MAX\_UE} - P_{UE} \quad (7)$$

$$P_{POWERCLASS} - \Delta T_C <= P_{MAX\_UE} <= P_{POWERCLASS} \quad (8)$$

where $\Delta T_C = 0$ dB or 1.5 dB $P_{UE}$ is the sum of transmit powers of all configured CCs in the UE.

The UE-level, PA-level, and CC-level TPL information described above form a layered structure. The UE-level is the highest layer (l=1), the PA-level is the middle layer (l=2) and the CC-level is the lowest layer (l=3). The layered structure is represented by certain mapping of symbols. In one example, ((CC1, CC2), (CC3), (CC4, CC5)) represents that the UE has three PAs (PA1, PA2, and PA3), and that CC1 and CC2 share PA1, CC3 uses PA2, and CC4 and CC5 share PA3. In another example, ((CC1)) represents that there is only one PA in the UE and CC1 is served by PA1. By considering the layered structure, the TPL information can be reduced accordingly when some of the TPL values in difference layers are redundant. In general, TPL values at layer-l and layer-(l+1) can be combined into one TPL value, if the layer-(l+1) entity is the only entity inside the layer-l entity.

Figures 4A, 4B:
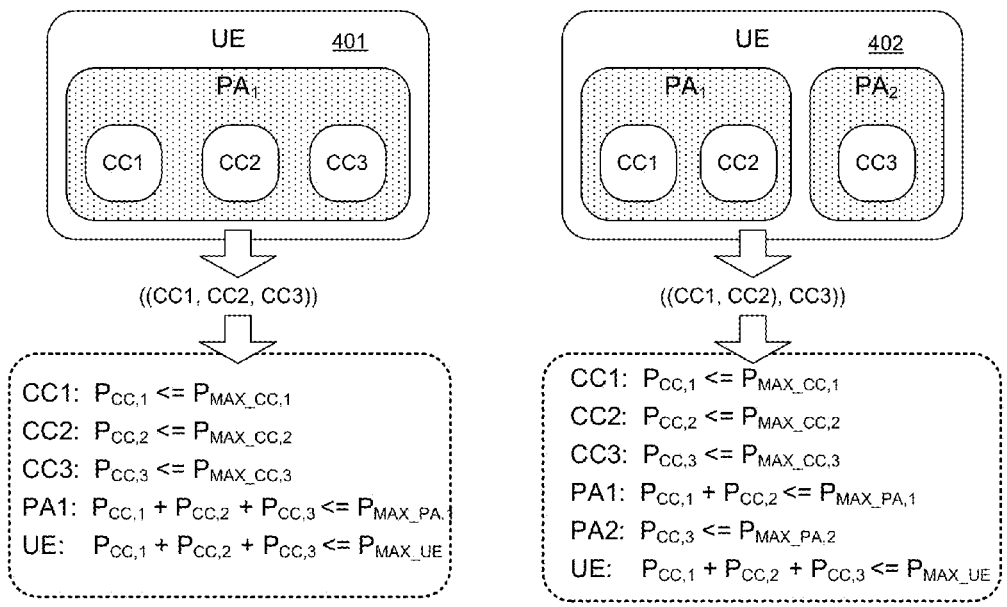
FIG. 4A illustrates a first example of TPL reduction when there is only one PA in a UE.
FIG. 4B illustrates a second example of TPL reduction when there is a PA serves only one CC.

FIGS. 4A and 4B illustrate examples of TPL reduction at different levels in accordance with one novel aspect. In the example of FIG. 4A, UE 401 is configured with three component carriers CC1, CC2, and CC3. All three CCs are served by the same power amplifier PA1. Such layered structure is represented as ((CC1, CC2, CC3)). Without TPL reduction, different TPL constraints in different levels are:

$$CC1: P_{CC,1} <= P_{MAX\_CC,1} \quad (A1)$$

$$CC2: P_{CC,2} <= P_{MAX\_CC,2} \quad (A2)$$

$$CC3: P_{CC,3} <= P_{MAX\_CC,3} \quad (A3)$$

$$PA1: P_{CC,1} + P_{CC,2} + P_{CC,3} <= P_{MAX\_PA,1} \quad (A4)$$

$$UE: P_{CC,1} + P_{CC,2} + P_{CC,3} <= P_{MAX\_UE} \quad (A5)$$

It can be seen from the above equations, that equation (A4) and equation (A5) may be reduced to one equation to represent one PA-level TPL, as long as the right TPL constraint can be determined. Generally, if there is only one PA (e.g., PA1) in a UE, and there are n active CCs (e.g., CC1 to CCn), then the UE-level TPL can be replaced by the PA-level TPL. In order to replace the UE-level TPL (e.g., $P_{MAX\_UE}$) by the PA-level TPL (e.g., $P_{MAX\_PA,1}$), a new TPL (e.g., $P_{MAX\_UE,PA,1\_UE}$) is defined and its lower bound and upper bound are determined. Mathematically, we have the PA-level TPL and the UE-level TPL and their lower bound and upper bound are as follows:

$$P_{CC1} + P_{CC2} + \ldots + P_{CCn} <= P_{MAX\_PA,1} \quad (A6)$$

$$P_{CC1} + P_{CC2} + \ldots + P_{CCn} <= P_{MAX\_UE} \quad (A7)$$

$$P_{POWERCLASS} - MPR_{PA,1} - A - MPR_{PA,1} - \Delta T_C <= P_{MAX\_PA,1} <= P_{POWERCLASS} \quad (A8)$$

$$P_{POWERCLASS} - \Delta T_C <= P_{MAX\_UE} <= P_{POWERCLASS} \quad (A9)$$

By combining (A6) and (A7) and combining (A8) and (A9), the new TPL $P_{MAX\_PA,1\_UE}$ is defined as:

$$P_{CC1} + P_{CC2} + \ldots + P_{CCn} <= P_{MAX\_PA,1\_UE} \quad (A10)$$

$$P_{POWERCLASS} - MPR_{PA,1} - A - MPR_{PA,1} - \Delta T_C <= P_{MAX\_PA,1\_UE} <= P_{POWERCLASS} \quad (A11)$$

Because the upper bound of $P_{MAX\_PA,1}$ and $P_{MAX\_UE}$ are the same, the upper bound of $P_{MAX\_PA,1\_UE}$ therefore is also $P_{POWERCLASS}$. On the other hand, the lower bound of $P_{MAX\_UE}$ is $P_{POWERCLASS} - \Delta T_C$, which represents the capability of the duplex filter, while the lower bound of $P_{MAX\_PA,1}$ is $P_{POWERCLASS} - MPR_{PA,1} - A - MPR_{PA,1} - \Delta T_C$, which represents the capability of the duplex filter and PA1. Therefore, the lower bound of $P_{MAX\_PA,1\_UE}$ should be the same as the lower bound of $P_{MAX\_PA,1}$. Finally, it can be concluded that $P_{MAX\_PA,1\_UE} := P_{MAX\_PA,1}$ and (A7) can be regarded as redundant.

In the example of FIG. 4B, UE 402 is configured with three component carriers CC1, CC2, and CC3. CC1 and CC2 are served by a first power amplifier PA1, while CC3 is served by a second power amplifier PA2. Such layered structure is represented as ((CC1, CC2), CC3)). Without TPL reduction, different TPL constraints in different levels are:

$$CC1: P_{CC,1} <= P_{MAX\_CC,1} \quad (B1)$$

$$CC2: P_{CC,2} <= P_{MAX\_CC,2} \quad (B2)$$

$$CC3: P_{CC,3} <= P_{MAX\_CC,3} \quad (B3)$$

$$PA1: P_{CC,1} + P_{CC,2} <= P_{MAX\_PA,1} \quad (B4)$$

$$PA2: P_{CC,3} <= P_{MAX\_PA,2} \quad (B5)$$

$$UE: P_{CC,1} + P_{CC,2} + P_{CC,3} <= P_{MAX\_UE} \quad (B6)$$

It can be seen from the above equations, that equation (B3) and equation (B5) may be reduced to one equation to represent one CC-level TPL, as long as the right TPL constraint can be determined. Generally, if the j-th PA serves only the i-th CC, then the PA-level TPL can be replaced by the CC-level TPL. In order to replace the PA-level TPL (e.g., $P_{MAX\_PA,j}$) by the CC-level TPL (e.g., $P_{MAX\_CC,i}$) a new TPL (e.g., $P_{MAX\_PA,j\_CC,i}$) is defined and its lower bound and upper bound are determined. We have the CC-level TPL and the PA-level TPL and their lower bound and upper bound as follows:

$$P_{CC,i} <= P_{MAX\_CC,i} \quad (B7)$$

$$P_{CC,i} <= P_{MAX\_PA,j} \quad (B8)$$

$$P_{EMAX,i} - \Delta T_{C,i} <= P_{MAX\_CC,i} <= P_{EMAX,i} \quad (B9)$$

$$P_{POWERCLASS} - MPR_{PA,j} - A - MPR_{PA,j} - \Delta T_{C,i} <= P_{MAX\_PA,j} <= P_{POWERCLASS} \quad (B10)$$

By combining (B7) and (B8) and combining (B9) and (B10), the new TPL $P_{MAX\_PA,j\_CC,i}$ is defined as:

$$P_{CC,i} <= P_{MAX\_PA,j\_CC,i} \quad (B11)$$

$$\min(P_{EMAX,i} - \Delta T_C, P_{POWERCLASS} - MPR_{PA,j} - A - MPR_{PA,j} - \Delta T_{C,i}) <= P_{MAX\_PA,j\_CC,i} <= \min(P_{EMAX,i}, P_{POWERCLASS}) \quad (B12)$$

For upper bound, the upper bound of $P_{MAX\_PA,j\_CC,i}$ is clearly min $(P_{EMAX,i}, P_{POWERCLASS})$. On the other hand, the lower bound of $P_{MAX\_CC,i}$ is $P_{EMAX,i} - \Delta T_C$, which represents the capability of the duplex filter shall be better than the $\Delta T_C$ constraint, while the lower bound of $P_{MAX\_PA,j}$ is $P_{POWERCLASS} - MPR_{PA,j} - A - MPR_{PA,j} - \Delta T_{C,i}$, which represents that besides the duplex filter capability, the capability of the PA shall be better than the $(MPR_{PA,j} + A - MPR_{PA,j})$ constraint. Therefore, the lower bound of $P_{MAX\_PA,j\_CC,i}$ should be decided by the weaker one of the duplex filter capability and the PA capability. As a result, it can be concluded that the lower bound of $P_{MAX\_PA,j\_CC,i}$ is min $(P_{EMAX,i} - \Delta T_C, P_{POWERCLASS} - MPR_{PA,j} - A - MPR_{PA,j} - \Delta T_{C,i})$. The newly defined CC-level TPL $P_{MAX\_PA,j\_CC,i}$ replaces both (B7) and (B8) when the j-the PA only serves the i-th CC.

Once the different levels of TPLs have been determined and reduced to non-redundant TPL values, the UE can calculate corresponding power headroom (PH) and perform PHR for each non-redundant TPL accordingly. There are two PHR schemes—complete PHR signaling and efficient PHR signaling. In complete PHR signaling, one PHR for each non-redundant TPL is calculated by the UE and reported to the eNB, given that the eNB knows the UE/PA/CC mapping of the UE. In efficient PHR signaling, some of the layered TPL/PH information is combined or deduced to further reduce signaling overhead.

Figure 5:
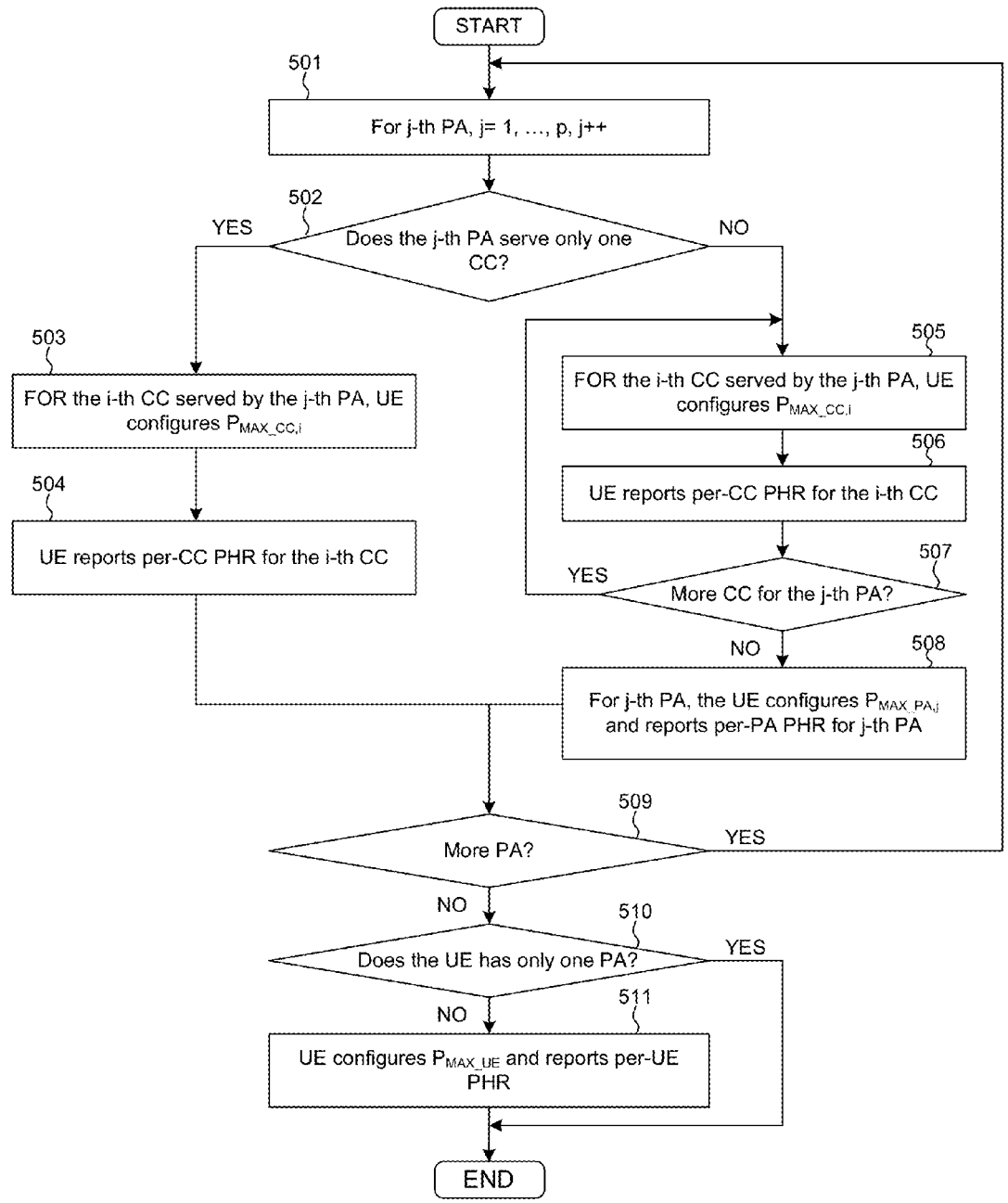
FIG. 5 is a flow chart of a method of complete power headroom reporting.

FIG. 5 is a flow chart of a method of complete power headroom reporting in accordance with one novel aspect. Suppose that a UE has a total number of p PAs. In step 501, the UE starts with the j-th PA (j=1 ... p, j++). In step 502, the UE checks whether the j-th PA serves only one CC. If the answer is yes, then the PA-level TPL may be replaced by the CC-level TPL. The UE configures the CC-level TPL $P_{MAX\_CC,i}$ for the i-th CC served by the j-th PA based on equation (B12) (step 503). The UE also reports the per-CC PHR based on equation (3) (step 504). On the other hand, if there are more than one CCs served by the j-th PA, then the UE configures $P_{MAX\_CC,i}$ for the i-th CC served by the j-th PA based on equation (4) (step 505). The UE also reports the per-CC PHR based on equation (3) (step 506). In step 507, the UE checks if there are more CCs in the j-th PA. If there is, then the UE repeats steps 505-506 until the TPL values for all the CCs served by the j-th PA are configured. The UE then configures the PA-level $P_{MAX\_PA,j}$ for the j-th PA based on equation (6), and reports the per-PA PHR based on equation (5) (step 508). In step 509, the UE checks if there are more PAs. If the answer is yes, the UE goes back to step 501 with an incremented j value and repeat step 502 through 508 for each PA. If there is no more PAs, in step 510, the UE checks if the UE only has one PA. If the answer is yes, then the complete PHR signaling is done because the UE-level TPL is replaced by the PA-level TPL based on equation (A11). If the UE has more than one PA, then the UE configures UE-level $P_{MAX\_UE}$ based on equation (8), and reports per-UE PHR based on equation (7) (step 511).

Figure 6A:
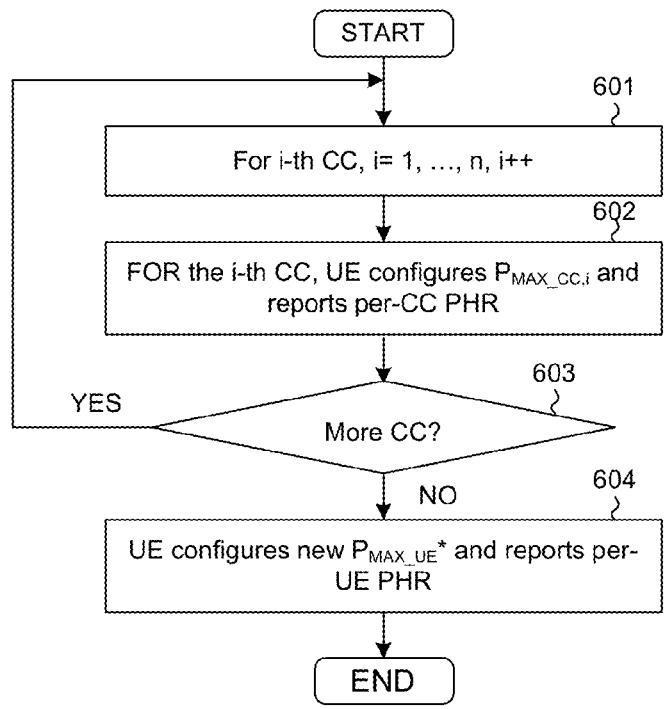
FIGS. 6A and 6B are flow charts of a method of efficient power headroom reporting.
Figure 6B:
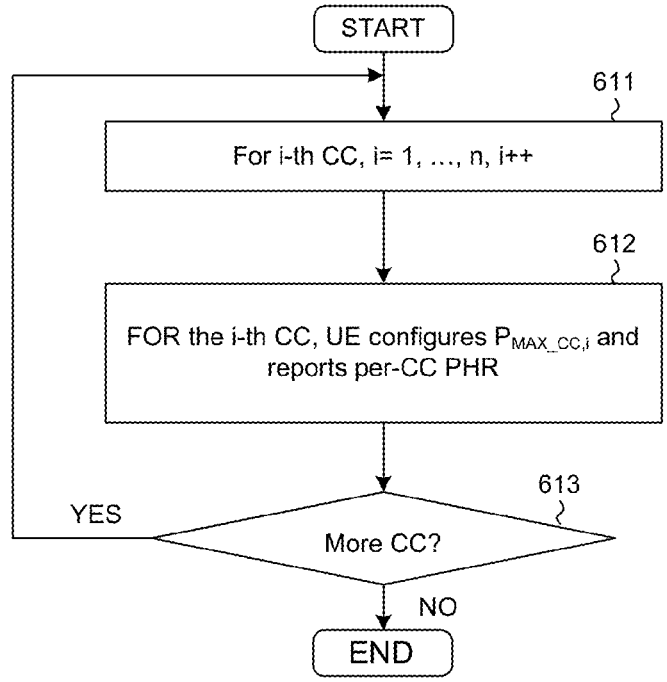

FIGS. 6A and 6B are flow charts of a method of efficient power headroom reporting in accordance with one novel aspect. FIG. 6A illustrates a first embodiment of efficient PHR signaling. In the first embodiment, a UE reports per-CC PHR for each CC plus per-UE PHR, while all PA-level TPLs and UE-level TPL are combined into a new UE-level TPL. The per-CC PHR reporting is the same as illustrated in FIG. 5. In step 601, the UE starts with the i-th CC (i=1 ... n, i++). In step 602, the UE configures $P_{MAX\_CC,i}$ and reports per-CC PHR for the i-th CC. In step 603, the UE checks if there are more CCs. If there is, then the UE repeats steps 601-602 until all CCs have been completed for PHR. In step 604, the UE configures a new UE-level TPL and reports per-UE PHR to the eNB. The new UE-level TPL $P_{MAX\_UE}^*$ is determined as follows. Assume there are p PAs in the UE, i.e., PA1 to PAp. For PAj, (1<=j<=p), m(j) number of CCs are served, and the m(j) CCs are labeled as CCj(1), CCj(2), CCj(m). Then the corresponding PA-level TPL is given as $$P_{CCj(1)} + \ldots + P_{CCj(m(j))} <= P_{MAX\_PA,j} (1<=j<=p) \quad (9)$$

Assume there are n active CCs in the UE, i.e., CC1 to CCn, and the UE-level TPL is $P_{MAX\_UE}$. As a result, the p PA-level TPLs defined by equation (9) become redundant if the following new TPL is imposed:

$$P_{CC,1} + \ldots + P_{CC,n} <= \min(P_{MAX\_UE}, P_{MAX\_PA,1}, \ldots, P_{MAX\_PA,p})$$

Then, the new UE-level per-UE PHR is:

$$P_{MAX\_UE}^* = \min(P_{MAX\_UE}, P_{MAX\_PA,1}, \ldots, P_{MAX\_PA,p})$$

$$PH_{UE}^* = P_{MAX\_UE}^* - P_{UE}$$

FIG. 6B illustrates a second embodiment of efficient PHR signaling. In the second embodiment, a UE reports per-CC PHR for each CC, and the eNB knows the UE/PA/CC mapping. In this embodiment, if the eNB knows exactly the values of CC-level TPL configured by the UE, then the eNB can obtain the transmit power at each CC from per-CC PHR. In one example, the UE always configures its CC-level TPL $P_{MAX\_CC,i}$ using the lowest allowable value, then the eNB knows the configured TPL values. In another example, the UE reports the configured TPL values to the eNB explicitly. In the example of FIG. 6B, in step 611, the UE starts with the i-th CC (i=1 ... n, i++). In step 612, the UE configures $P_{MAX\_CC,i}$ and reports both the configured $P_{MAX\_CC,i}$ and per-CC PHR for the i-th CC to the eNB. In step 613, the UE checks if there are more CCs. If there is, then the UE repeats steps 611-612 until all CCs have been completed for PHR. Since the UE/PA/CC mapping is known to the eNB, the eNB knows all TPLs.

Figure 7:
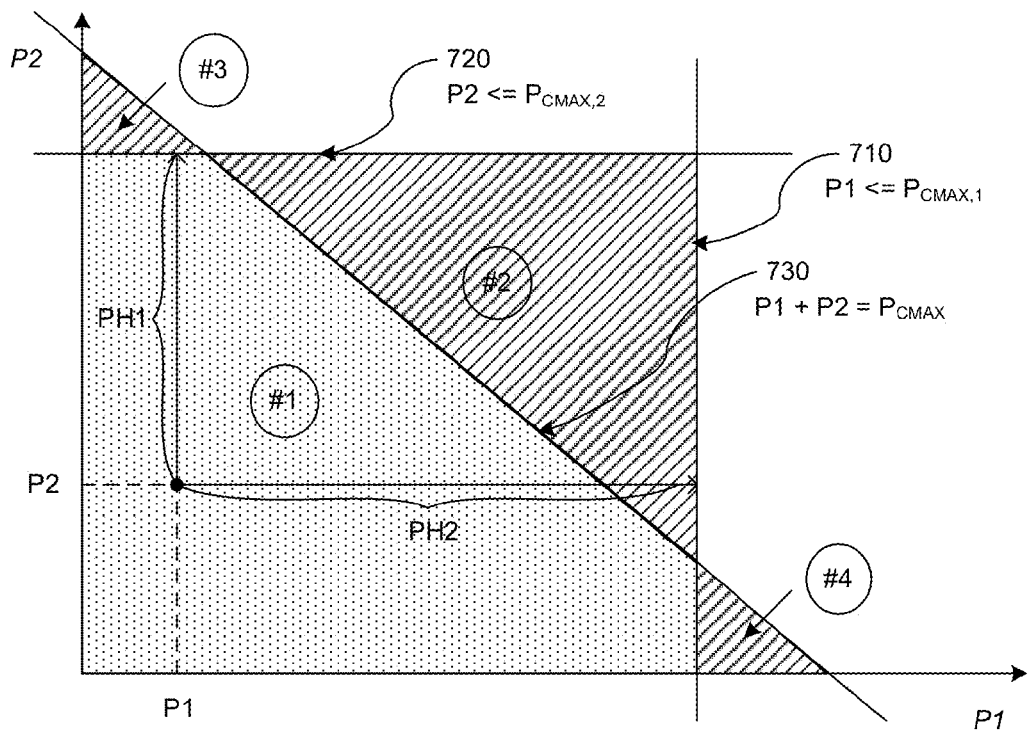
FIG. 7 illustrates a method of indicating UE transmit power capacity in accordance with one novel aspect.

FIG. 7 illustrates a method of indicating UE transmit power capacity in accordance with one novel aspect. In the example of FIG. 7, a UE is configured with two component carriers CC1 and CC2. The transmit power over CC1 is P1 and the transmit power over CC2 is P2. The UE has the following transmit power constraints: $P1<=P_{CMAX,1}$ as denoted by a vertical line 710, $P2<=P_{CMAX,2}$ as denoted by a horizontal line 720, and $P1+P2<=P_{CMAX}$ as denoted by a diagonal line 730. The transmit power constraints $P_{CMAX,1}$ and $P_{CMAX,2}$ are the CC-level TPLs defined above, while the transmit power constraint $P_{CMAX}$ is the UE-level TPL defined above. A valid UE transmit power combination in the two CCs should fall in the intersection of the regions indicated by all three power constraints, i.e., region #1 as denoted by the dotted-shade. On the other hand, if only one or two power constraints are used, then the UE transmit power may go outside region 1 into other regions such as region #2, #3, or #4, as denoted by the slashed-shade.

Figure 1:
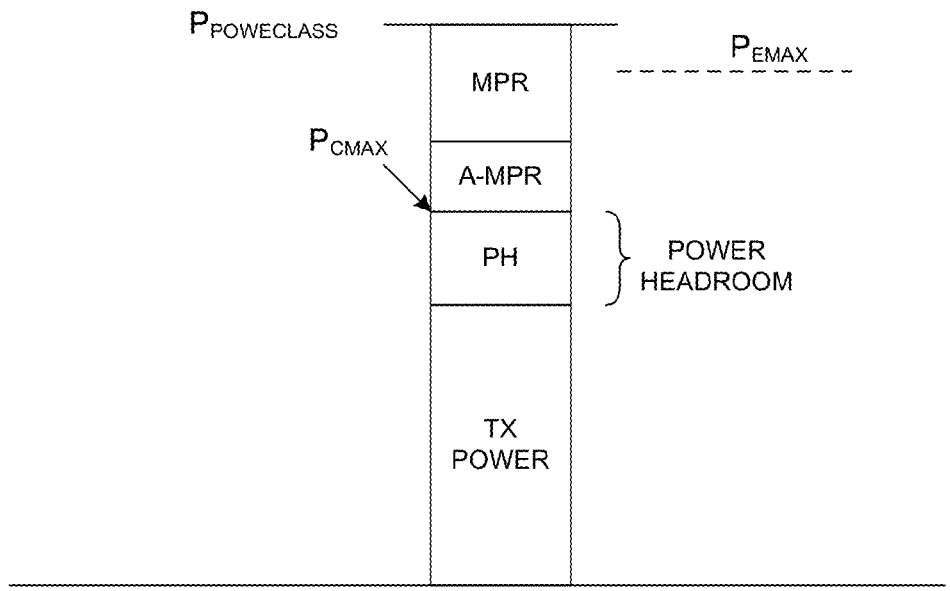
FIG. 1 (Prior Art) illustrates a power headroom and other related parameters of a UE in LTE Rel-8/9 systems without carrier aggregation.
Figure 2:
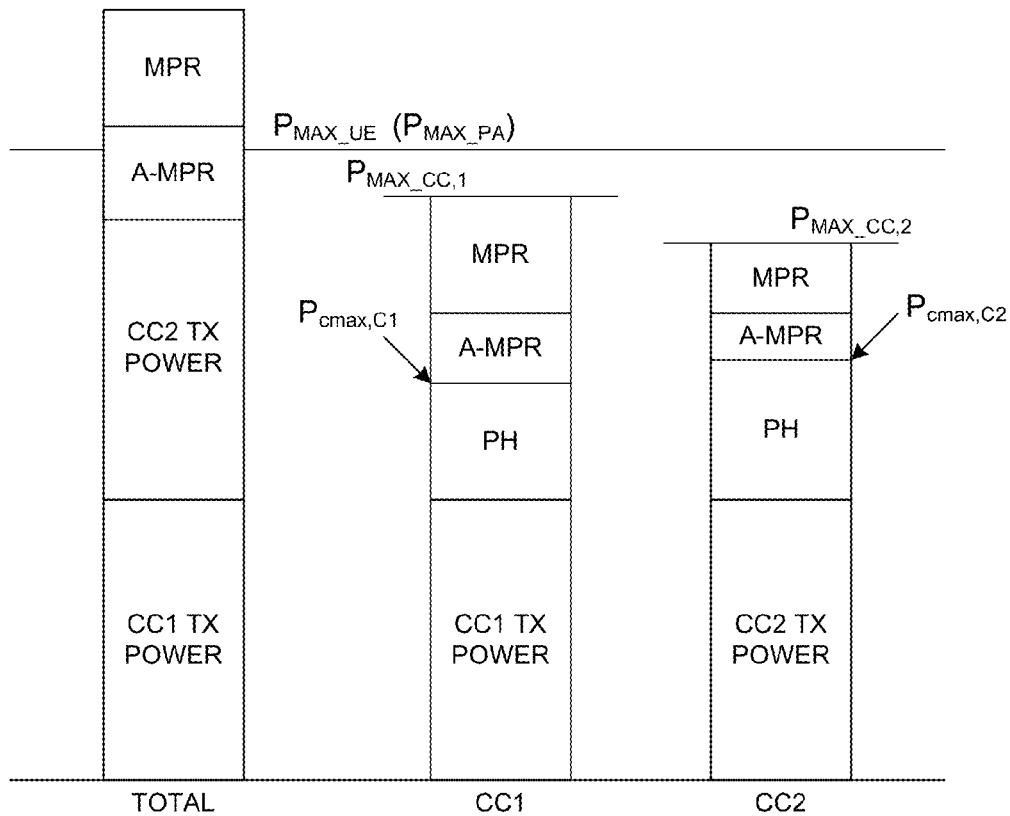
FIG. 2 (Prior Art) illustrates multiple power headroom values and other related parameters of a UE in LTE Rel-10 systems with carrier aggregation.

To assist the network (eNB) in selecting a suitable resource allocation to a UE (e.g., the combination of MCS and the resource size/location) that does not result in the UE violating the power constraints, the UE is configured to provide regular PH information to the network. The UE transmit power at CC and UE level can never exceed the limitations of $P_{CMAX,c}$ and $P_{CMAX}$. If the calculated the transmit power are above the limits, the actual transmit power would be scaled down. That is, in FIG. 1, if the calculated transmit powers at CC and UE levels fall in regions #2, #3, or #4, or even in the outer area, the calculated powers are scaled down such that the actual transmit powers fall in region #1. In fact, power headroom is not a measure of the difference between the maximum transmit power and the actual transmit power. Rather, power headroom is a measure of the difference between the maximum transmit power and the calculated transmit power (e.g., $PHR_1=P_{CMAX,1}-P1$, and $PHR_2=P_{CMAX,2}-P2$). Thus, a PH value can be negative, which indicates that the UE transmit power is already limited by the maximum transmit power at the time of the PHR reporting.

Based on the illustration from FIG. 7, to enable the network to get a full picture of UE power usage, the UE should report the true values of the maximum transmit power along with PHRs, so that the network knows the exact boundaries of region #1. Generally, consider a UE that is configured with CC1, CC2, ..., CCN. The power constraints are configured as:

$$Pc <= P_{CMAX,C}, 1 \le c \le N \quad (10)$$

$$P1 + P2 + \ldots + PN \le P_{CMAX} \quad (11)$$

At each PHR reporting instance, the UE reports the following PH information to the network:

$PHR_1, PHR_2, \ldots, PHR_N$
$P_{CMAX,1}, P_{CMAX,2}, \ldots, P_{CMAX,N}$; and
$P_{CMAX}$ A more general form of UE transmit power can be formulated if there are more levels of transmit power limitations such as PA-level TPL as described above. Suppose that there are K constraints for the transmit power limitations, and they are referred to as constraints 1, 2, ..., K. Define a set Jk for $1 <= k <= K$, where the transmit power in the c-th CC is involved in the k-th constraint if c belongs to the set Jk. The power limitation for the k-th constraint is denoted by $P_{MAX,K}$. Then, mathematically, we have $$\Sigma_{c=1}^{N} 1_{\{c \in J_k\}} * P_c \leq P_{MAX,k}, 1 \leq k \leq K \quad (12)$$

where $1_{\{\}}$ is an indicator function equal to 1 if the condition in the bracket { } is true, and equal to 0 otherwise. For example, the power constraints in (10) and (11) can be embraced into (12) by setting K=N+1, $J_k=\{k\}$ for $1<=k<=N$, $J_{N+1}=\{1, 2, \ldots, N\}$, $P_{MAX,k}=P_{CMAX,k}$ for $1<=k<=N$, and $P_{MAX,N+1}=P_{CMAX}$.

Figure 8:
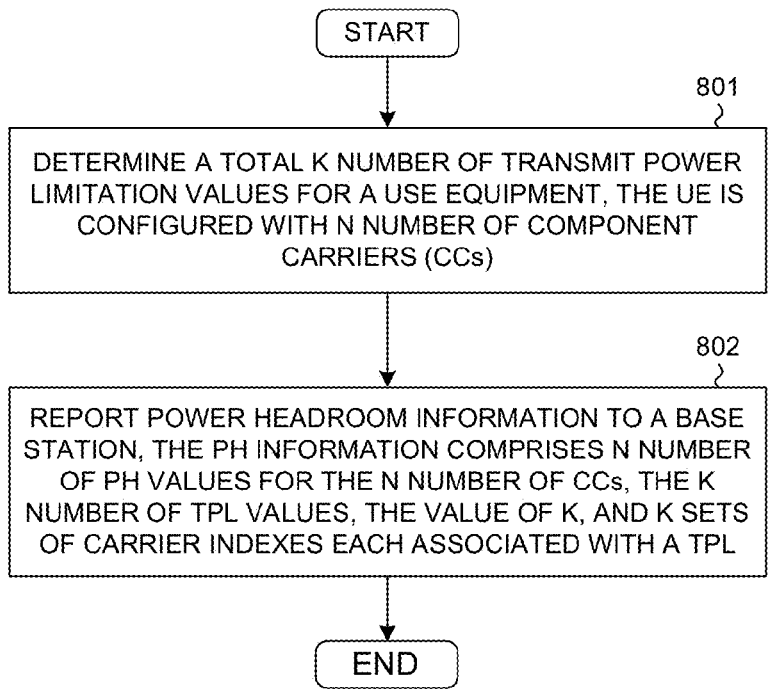
FIG. 8 is a flow chart of the method of indicating UE transmit power capacity in accordance with one novel aspect.

Consider a UE is configured with CC1, CC2, ..., CCN, and the UE transmit power limitation is governed by the equalities in (12). Considering this more generic setting, at each PHR reporting instance, the UE reports the following PH information to the network:

$PHR_1, PHR_2, \ldots, PHR_N$;
The value of K;
$P_{MAX1}, P_{MAX2}, \ldots, P_{MAXK}$; and
$J_1, J_2, \ldots, J_K$ FIG. 8 is a flow chart of a method of indicating UE transmit power capacity in accordance with one novel aspect. In step 801, a UE determines a total K number of transmit power limitation (TPL) values, the UE is configured with N number of component carriers (CCs). In step 802, the UE reports power headroom (PH) information to an eNB. The power headroom information comprises N number of PH values for each CC, the value of K, the K number of TPL values, and K sets of carrier indexes—each set contains carrier indexes that are associated with a corresponding TPL.

Once a UE has configured all the necessary TPL values and calculated all the power headroom to be reported, the PH information is signaled to its serving eNB by radio resource control (RRC) layer messaging. Besides the existing PHR triggers, new triggers for PHR may be defined. For example, when a new secondary cell (Scell) is added or removed, when resource allocation or reference resource allocation changes, when the eNB requests more power than the UE can support, i.e., the combined transmit power is over the maximum power. Alternatively, the UE can autonomously activate the PHR mechanism. When the PHR triggering condition is satisfied, the UE MAC layer prepares PH information and includes the information to a transmission block (TB). This TB is then sent over one of the active CCs. For non-scheduled CC, a reference resource allocation (RRA) for calculating PHR is signaled by the eNB, or the UE can use a pre-defined default RRA to calculate corresponding PH value.

Figure 9:
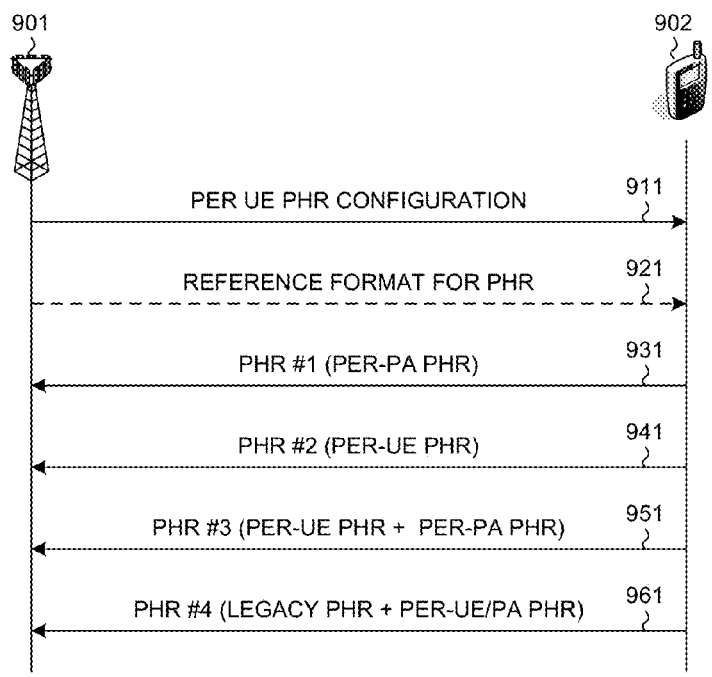
FIG. 9 illustrates a PHR procedure between an eNB and a UE in accordance with one novel aspect.

FIG. 9 illustrates a power headroom reporting procedure between an eNB901 and a UE902 in an LTE/LTE-A wireless network in accordance with one novel aspect. In step 911, eNB901 transmits a PHR configuration message to UE902. In step 921, eNB91 optionally transmits reference format for the PHR configuration. Otherwise, default format may be used. In step 931, UE902 reports PHR #1 (e.g., per-PA PHR) to eNB901. In step 941, UE902 reports PHR #2 (e.g., per-UE PHR) to eNB901. In step 951, UE902 reports PHR #3 (e.g., per-UE PHR and per-PA PHR) to eNB901. Finally, in step 961, UE902 reports PHR #4 (e.g., legacy PHR and per-UE/PA PHR) to eNB901.

To support PHR mechanism in wireless networks with carrier aggregation, new PHR format is needed. Either a fixed-length MAC control element (CE) or a variable-length MAC CE may be used for PHR. A mapping for a CC and its PH value needs to be indicated in the PHR. In one embodiment, implicit mapping may be used. For example, PH values have an ascending or descending order according to its cell index. In another embodiment, explicit mapping may be used. For example, a bitmap or length indicator is used in the PHR. Furthermore, the type of PHR needs to be differentiated by an indicator. The PHR contains a real PH value if the PH value is calculated using an actual transmission grant (# of PRB and modulation order). On the other hand, a PHR contains a virtual PH value if the PH value is calculated using a reference grant (# of PRB and modulation order).

Figure 10:
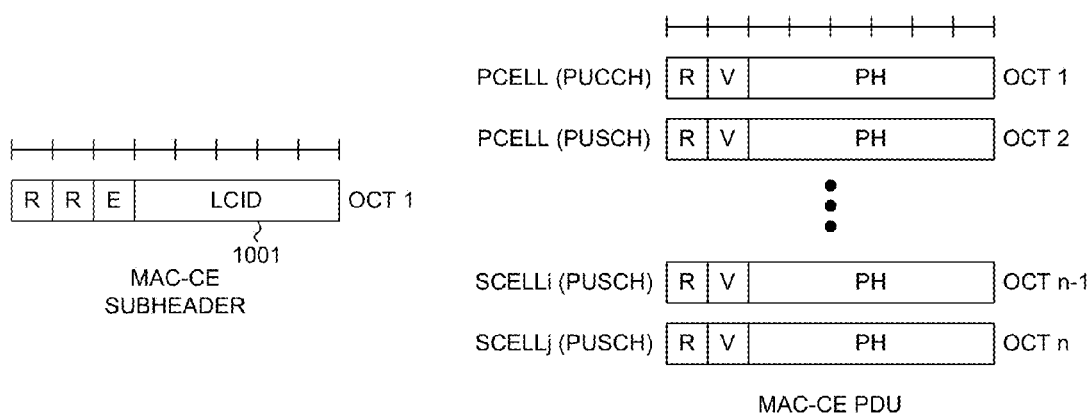
FIG. 10 illustrates examples of fixed-length MAC CE for power headroom reporting.

FIG. 10 illustrates examples of fixed-length MAC CE for PHR. In MAC sub-header 1001, a new LCID is assigned for PHR. On per transmission time interval (TTI) basis, the length of the MAC CE is known to the eNB. For example, the length is a function of configured CCs, a function of activated CCs, or a function of scheduled CCs, all defined by the eNB in the PHR configuration message. Within the MAC CE PDU, as illustrated in FIG. 10, the PH values are ordered from PH of PUCCH Pcell (also referred as type 2 PHR), PH of PUSCH PCell (also referred as type 1 PHR), and then followed by PH values of PUSCH Scell, in ascending or descending order according to the cell index. A bit V indicates the type of PHR.

Figure 11:
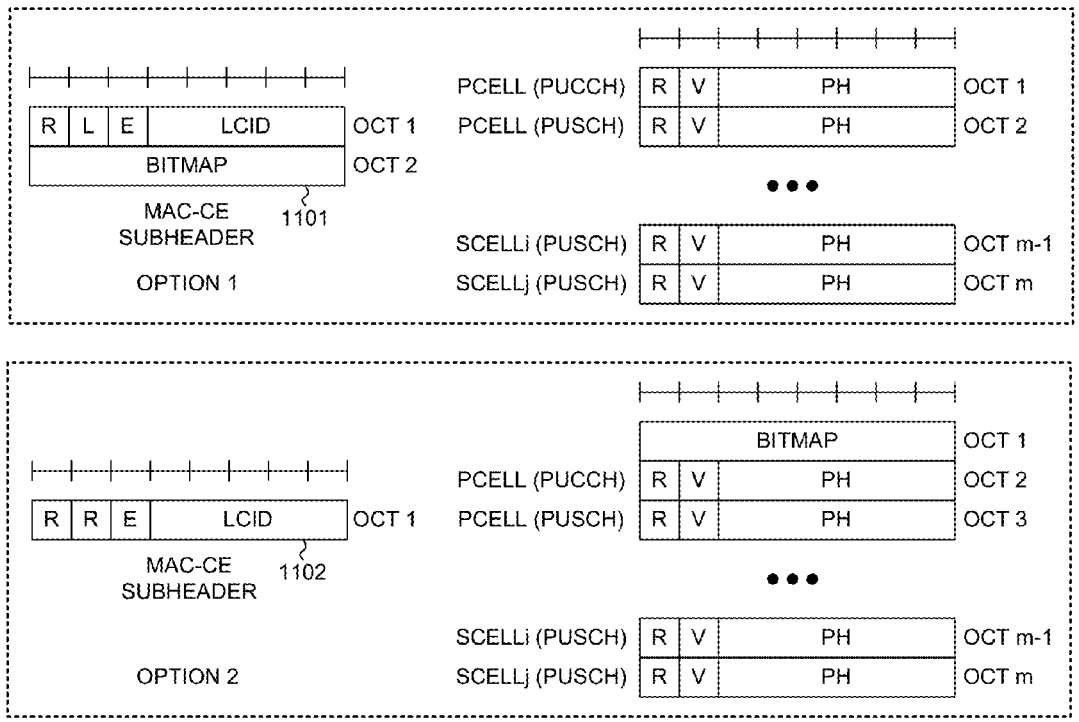
FIG. 11 illustrates examples of variable-length MAC CE for power headroom reporting.

FIG. 11 illustrates examples of variable-length MAC CE for PHR. Similar to fixed length PHR, a new LCID is assigned in the MAC sub-header for variable length MAC CE PHR. The length of the MAC CE is indicated either in the MAC sub-header or in the MAC CE PDU. As illustrated in the top half of FIG. 11, the length is indicated in the MAC sub-header 1101, which contains two octets, the first octet 1 contains the LCID, while the second octet 2 contains a bitmap used as the length indication. For example, a PH value of a CC is included in the MAC CE PDU only when a corresponding bit is set in the bitmap, so that the eNB can identify the length of the MAC CE from the bitmap. In the bottom half of FIG. 11, the length is indicated in the MAC CE PDU. Octet 1 in the MAC PDU contains a bitmap used as the length indication.

Figure 12:
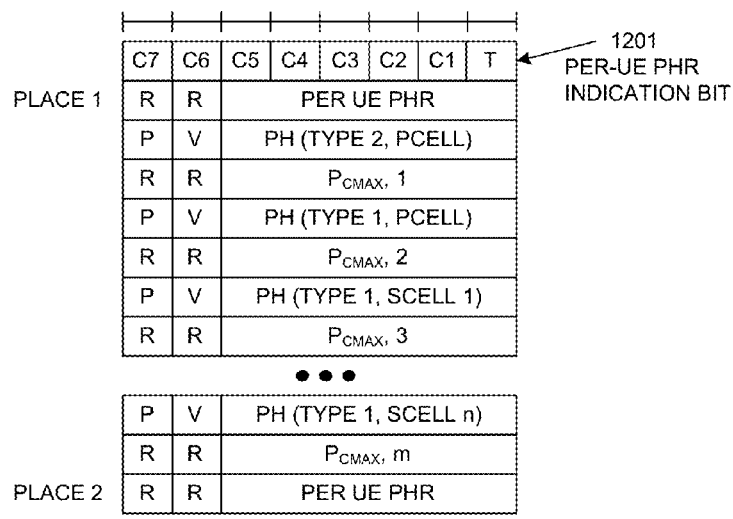
FIG. 12 illustrates an embodiment of a new format for per UE PHR.

FIG. 12 illustrates an embodiment of a new format for per-UE PHR. To indicate that per-UE PHR is reported, one option is to use a new LCID for per-UE PHR. Another option is to use a bit 1201 inside the PHR PDU to indicate whether per-UE PHR is included, as illustrated in FIG. 12. The place to per-UE PHR may also have two options. A first option is to include the per-UE PHR right after the bitmap of the PHR MAC CE (e.g., Place 1), while a second option is to include the per-UE PHR at the end of the PHR MAC CE (e.g., place 2). The reserved bit R may be used to indicate additional information of the per-UE PHR. Similar format may be used for per-PA PHR.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method, comprising:
   determining transmit power limitation (TPL) information by a UE in a wireless communication system, wherein the UE is configured with a plurality of component carriers (CCs) served by one or more power amplifiers (PAs), wherein the TPL information comprises a set of TPL values, each TPL value corresponds to a UE-configured maximum transmit power for the UE;

determining power headroom (PH) information that comprises a set of PH values based on the TPL information; and reporting the PH information to a base station, wherein the TPL information is reduced to contain a reduced set of non-redundant TPL values, and wherein the PH information is also reduced to contain a reduced set of non-redundant PH values.

2. The method of claim 1, wherein the set of TPL values comprises a UE-level TPL value for the UE, one or more PA-level TPL values for each PA, and a plurality of CC-level TPL values for each CC.

3. The method of claim 1, wherein the set of PH values comprises a UE-level PH value for the UE, one or more PA-level PH values for each PA, and a plurality of CC-level PH values for each CC.

4. The method of claim 1, wherein the UE has only one PA, and wherein the UE-level TPL value for the UE is replaced by a PA-level TPL value for the PA.

5. The method of claim 1, wherein a PA serves only one CC, and wherein a PA-level TPL value for the PA is replaced by a CC-level TPL value for the CC.

6. The method of claim 1, wherein the PH information is reported to the based station via a fixed-length MAC control element (CE), wherein the length is configured by the base station.

7. The method of claim 1, wherein the PH information is reported to the based station via a variable-length MAC control element (CE), wherein the length is indicated in the MAC CE.

8. A user equipment (UE) device, comprising:
a power control module that determines transmit power limitation (TPL) information, wherein the UE is configured with a plurality of component carriers (CCs) served by one or more power amplifiers (PAs), wherein the TPL information comprises a set of TPL values, each TPL value corresponds to a UE-configured maximum transmit power for the UE, and wherein the power control module determines power headroom (PH) information that comprises a set of PH values based on the TPL information; and
a transmitter that reports the PH information to a base station, wherein the TPL information is reduced to contain a reduced set of non-redundant TPL values, and wherein the PH information is also reduced to contain a reduced set of non-redundant PH values.

9. The device of claim 8, wherein the set of TPL values comprises a UE-level TPL value for the UE, one or more PA-level TPL values for each PA, and a plurality of CC-level TPL values for each CC.

10. The device of claim 8, wherein the set of PH values comprises a UE-level PH value for the UE, one or more PA-level PH values for each PA, and a plurality of CC-level PH values for each CC.

11. The device of claim 8, wherein the UE has only one PA, and wherein the UE-level TPL value for the UE is replaced by a PA-level TPL value for the PA.

12. The device of claim 8, wherein a PA serves only one CC, and wherein a PA-level TPL value for the PA is replaced by a CC-level TPL value for the CC.

13. The device of claim 8, wherein the PH information is reported to the based station via a fixed-length MAC control element (CE), wherein the length is configured by the base station.

14. The device of claim 8, wherein the PH information is reported to the based station via a variable-length MAC control element (CE), wherein the length is indicated in the MAC CE.

15. A method, comprising:
determining a total K number of transmit power limit (TPL) values for a user equipment (UE) in a wireless communication system, wherein the UE is configured with N number of component carriers (CCs); and
reporting power headroom (PH) information to a base station, wherein the PH information comprises N number of PH values for the N number of CCs and K number of TPL values, wherein the PH information is reported to the based station via a MAC control element (CE), and wherein the length of the MAC CE for reporting the PH information is a function of a number of CCs configured by the base station or indicated in the MAC CE.

16. The method of claim 15, wherein the PH information further comprises the value of K.

17. The method of claim 15, wherein one of the TPL values represents a UE-configured maximum transmit power for the UE.

18. The method of claim 15, wherein the UE comprises a power amplifier (PA), and wherein one of the TPL values represents a UE-configured maximum transmit power for the PA.

19. The method of claim 15, further comprising:
transmitting a maximum UE output power ($P_{powerclass}$) to the base station.

20. The method of claim 15, wherein the MAC CE subheader contains a LCID assigned for PH information reporting.

* * * * *